United States Patent [19]
Carley

[11] Patent Number: 5,122,883
[45] Date of Patent: Jun. 16, 1992

[54] RASTER SCANNING ENGINE DRIVER WHICH INDEPENDENTLY LOCATES ENGINE DRIVE SIGNAL TRANSITIONS WITHIN EACH PIXEL

[75] Inventor: Adam L. Carley, Windham, N.H.

[73] Assignee: Xerographic Laser Images Corporation, Woburn, Mass.

[21] Appl. No.: 487,540

[22] Filed: Mar. 2, 1990

[51] Int. Cl.$^5$ .......................... H04N 1/21; H04N 1/23; H04N 1/40

[52] U.S. Cl. ..................................... 358/296; 358/298; 358/459

[58] Field of Search ................. 358/298, 458, 459, 296

[56] References Cited

U.S. PATENT DOCUMENTS

| | | | |
|---|---|---|---|
| 3,916,096 | 10/1975 | Everett et al. | 358/456 |
| 4,149,183 | 4/1979 | Pellar et al. | 358/459 X |
| 4,626,923 | 12/1986 | Yoshida | 358/459 |
| 4,782,398 | 11/1988 | Mita | 358/298 X |
| 4,800,442 | 1/1989 | Riseman et al. | 358/459 |
| 4,864,419 | 9/1989 | Saito et al. | 358/298 X |
| 4,926,248 | 5/1990 | Kobayashi et al. | 358/459 X |
| 4,987,495 | 1/1991 | Arai | 358/458 X |

Primary Examiner—Benjamin R. Fuller
Assistant Examiner—Eric Frahm
Attorney, Agent, or Firm—Iandiorio & Dingman

[57] ABSTRACT

A raster scanning print engine driver accomplished by establishing a pixel scan time period representing a pixel print area, generating a number of pixel signals independently representative of the position and of the length of each line segments to be printed in the pixel print area, and producing from the pixel signals a pulse width and position modulated print engine drive signal representative of the position and length of the line segments to be printed in the pixel print area.

22 Claims, 10 Drawing Sheets

RASTER SCANNING ENGINE DRIVER WHICH INDEPENDENTLY LOCATES ENGINE DRIVE SIGNAL TRANSITIONS WITHIN EACH PIXEL

FIELD OF INVENTION

This invention relates to a raster scanning print engine driver particularly suited for high resolution halftone dot printing.

BACKGROUND OF INVENTION

The best current methods of reproducing images of halftones pulse-width-modulate the digital video signal used to drive the raster scanning print engine for reproducing the image. The image may be reproduced using either halftone dots or vertical lines of varying width to create the gray scale.

U.S. Pat. No. 4,800,442 discloses a line screen apparatus in which the raster scanning print engine drive signal is pulse-width-modulated by comparison of an analog video data signal to a sawtooth wave form. The analog signals are derived from lookup tables addressed by digital input signals. Another example of a pulse-width-modulation technique is disclosed in U.S. Pat. No. 3,916,096.

There are several problems with these pulse width modulation techniques which have prevented them from creating high quality reproductions of halftone images. Typically, the sawtooth pattern has the same period as the pixels. An analog video signal, having a discrete value in each pixel time period, is then compared to the sawtooth for generating the pulse-width-modulated signal. However, because the sawtooth is symmetric and the analog signal is single-valued, the digital video signal pulses are of necessity centered within each pixel, creating printed lines or dots which are also of necessity centered in the pixels. As a result, these pulse-width modulation print engine drivers can not alter the position of the pulse within the pixel area, and so do not have the flexibility to reproduce with great precision halftone images.

Another problem which greatly affects the image quality of these systems is their method of establishing line-to-line synchronization of the video signal supplied to the raster scanning print engine, critical for high quality images. Horizontal synchronization is accomplished in U.S. Pat. No. 4,800,442 by comparing a seventy-two MHz reference clock signal to the horizontal sync signal generated by the laser printer beam detector to enable generation of pixel clock timing signals at a frequency of 18 MHz. However, this technique results in a line-to-line synchronization error of up to 25% of the pixel clock period, resulting in significant horizontal jitter. In addition, the high frequency reference is a potential source of RFI in the system.

The combination of the symmetric nature of the pulse width modulated digital video signals and the horizontal jitter of the known halftone image reproduction techniques has significantly limited the quality of the reproduced image. As a result, there exists a need for relatively inexpensive, high-quality halftone image reproduction apparatus.

SUMMARY OF INVENTION

It is therefore an object of this invention to provide an extremely high resolution raster scanning print engine driver.

It is a further object of this invention to provide such a driver which modulates both the pulse width and pulse position, and can reverse its polarity at precise positions.

It is a further object of this invention to provide such a driver in which the video drive signal is transition modulated.

It is a further object of this invention to provide such a driver in which the transitions can occur up to three times per pixel.

It is a further object of this invention to provide such a driver in which the transitions can occur at hundreds of locations in each pixel.

It is a further object of this invention to provide such a driver which does not require expensive circuitry and operates with high precision.

It is a further object of this invention to provide such a driver in which the horizontal line to line synchronization is extremely precise.

It is a further object of this invention to provide such a driver in which the horizontal synchronization is accomplished with an inexpensive, low-frequency reference clock.

This invention results from the realization that the effective resolution of raster scanning print engines can be dramatically and inexpensively increased by modulating both the width and position of the pulses in the video signal within each pixel, and by closely synchronizing from line-to-line the digital video signal to prevent jitter.

This invention features a raster scanning print engine driver for generating from an incoming signal representing an image a series of engine drive signals for causing the engine to reproduce the image as a series of printed line segments, including means for establishing a pixel scan time period representing a pixel print area, means for generating a plurality of pixel signals for separately defining the position and the length of each line segment to be printed in the pixel print area, and means for producing from the pixel signals a pulse width and position modulated print engine drive signal representative of the position and length of the line segments to be printed in the pixel print area.

In a preferred embodiment, a ramp signal having a usable duration no greater than the pixel scan time period is employed to generate the print engine drive signal. In that case, the pixel signals are preferably analog signals, which are compared to the ramp signal for inverting the drive signal when the ramp signal and the analog signal cross.

Preferably, there is further included some means for indicating the beginning of a print engine raster scan. In that case, means for synchronizing the pixel print area to the beginning of the raster scan in response to the beginning of the print engine raster scan are preferably included. This may be accomplished by generating a digital timing signal used to establish the pixel scan time period. In that case, the means for establishing the pixel print area is preferably responsive to the means for generating the digital timing signal for synchronizing the pixel print area to beginning of the raster scan The timing signal is preferably generated from a clock signal with the same period as the timing signal by dividing the clock signal period into equal time intervals and synchronizing the start of the timing signal to an interval occurring at the start of the laser scan.

In a preferred embodiment, the raster scanning print engine driver according to this invention is accomplished with means for establishing a pixel time period, means for generating at least one ramp signal, and means for generating first and second analog data signals representative of the position and length of any line segments to be printed. Further included are first means for comparing in the pixel time period the first analog data signal to the ramp signal to change the state of the video drive signal a first time when the ramp signal and the first data signal cross, and second means for comparing in the pixel time period the second analog data signal to the ramp signal to change the state of the drive signal a second time when the ramp signal and the second data signal cross. Preferably, the ramp signal is squelched on the occurrence of the second drive signal state change.

DISCLOSURE OF PREFERRED EMBODIMENTS

Other objects, features and advantages will occur to one skilled in the art from the following description of preferred embodiments in the accompanying drawings in which.

This invention may be accomplished in a raster scanning print engine driver employing a video signal in which the pulse width and pulse position of the signal in each pixel may be separately established to provide a signal which can be used to precisely reproduce a halftone image.

Figure 1:
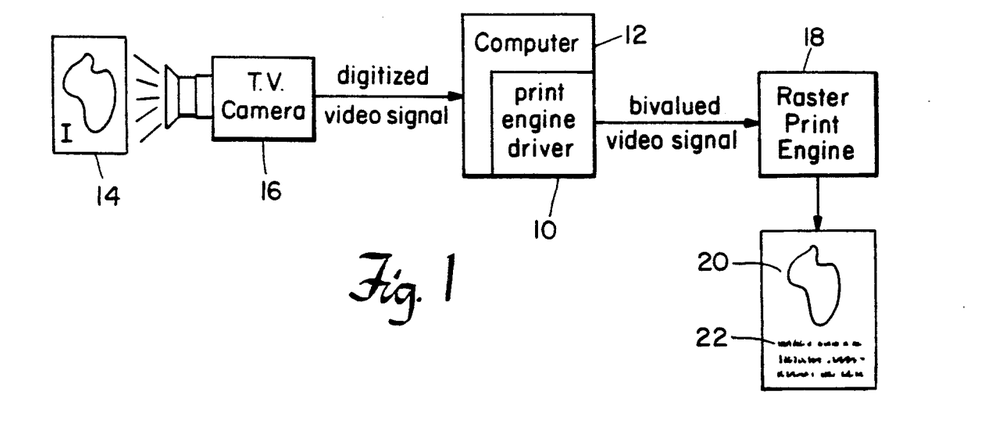
FIG. 1 is a block diagram of a typical use of the raster scanning print engine driver according to this invention for translating a scanned image into a video signal for application to a raster scanning print engine to reproduce a halftone image.

There is shown in FIG. 1 print engine driver 10 according to this invention which typically resides on a printed circuit board connected to the bus of computer 12, which may be, for example, an IBM PC/AT. Print engine driver 10 translates the video signal from T.V. camera 16 scanning image 14 (or alternatively a scanner) into a video signal applied to raster scanning print engine 18 for reproducing the halftone image 20. Print engine driver 10 may also generate a video signal for printing of text 22 along with image 20.

Figure 2A:
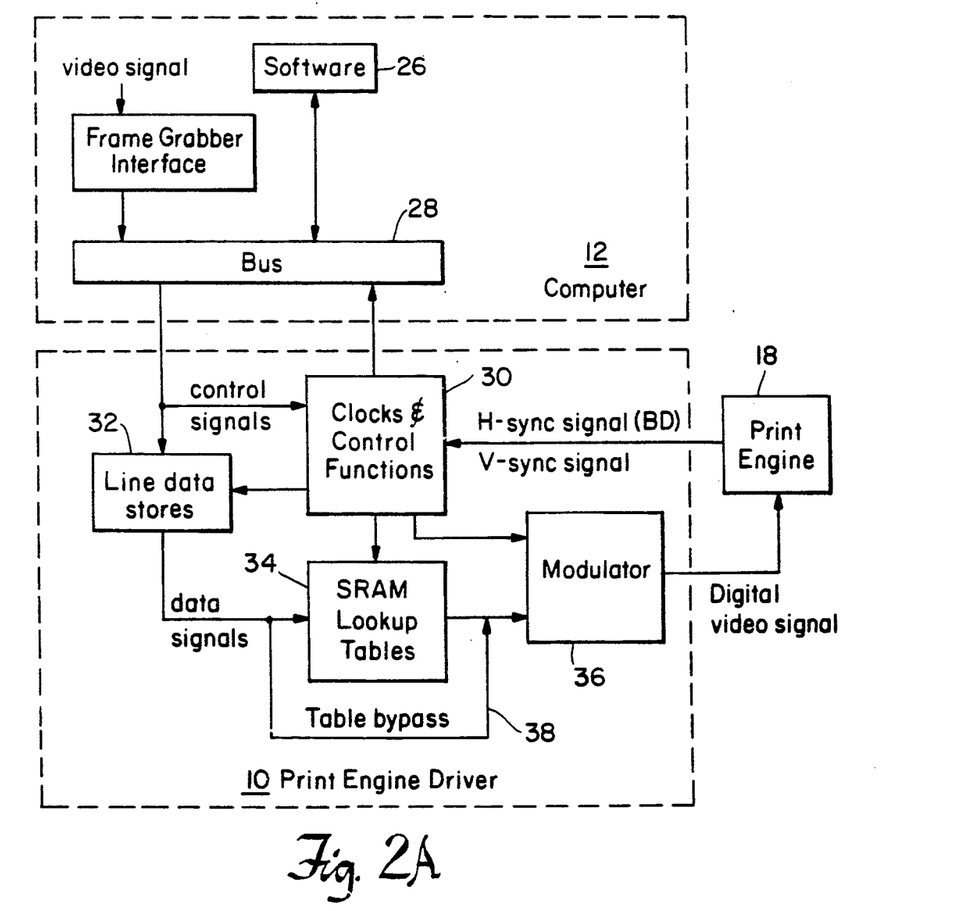
FIG. 2A is a block diagram of the raster scanning print engine driver of FIG. 1.

Print engine driver 10 is shown in more detail in FIG. 2A, in which it can be seen that driver 10 is connected to 16-bit bus 28 of computer 12, which is controlled by the print engine driver software 26, which also forms part of the raster scanning print engine driver according to this invention. Software 26 resides in the host computer or a separate embedded microprocessor system. Print engine driver 10 takes in the digitized video signal from the resident frame grabber or interface; the signal may be generated either from scanning an image with, for example, a T.V. camera or scanner, or may be an image residing in the memory of computer 12 (computer-generated or any other source), typically used when the image is repeatedly printed out, such as for example printing a company logo.

Under control of software 26, the incoming video digital signal is sent to line data store 32, which buffers the data signals to move groups of signals representing an entire scan line of the print engine through the remainder of the print engine driver, as explained more fully below in conjunction with FIG. 4. Software generated control signals are applied to clocks and control function circuit 30 for generating the timing and control signals for print engine driver 10, as will be more fully explained. Circuit 30 is also responsive to the horizontal and vertical synchronization signals from print engine 18 for horizontal and vertical synchronization of the printed image on the page.

The data signals are clocked from the line data store into the SRAM lookup tables (LUTs). The data signals are used as addresses for the lookup tables, which then output digital signals representing the location of transition(s) of the output video signal within a pixel area. Those signals are applied to modulator circuit 36, which in response creates the pulse width and pulse position modulated video signal applied to print engine 18 for control of the laser, LED, or other printing device to reproduce the halftone image as one or more line segments of controllable position and length within the pixel print areas to provide line segment(s) and/or blanks along the scan line of precisely controlled position and length.

Figure 2B:
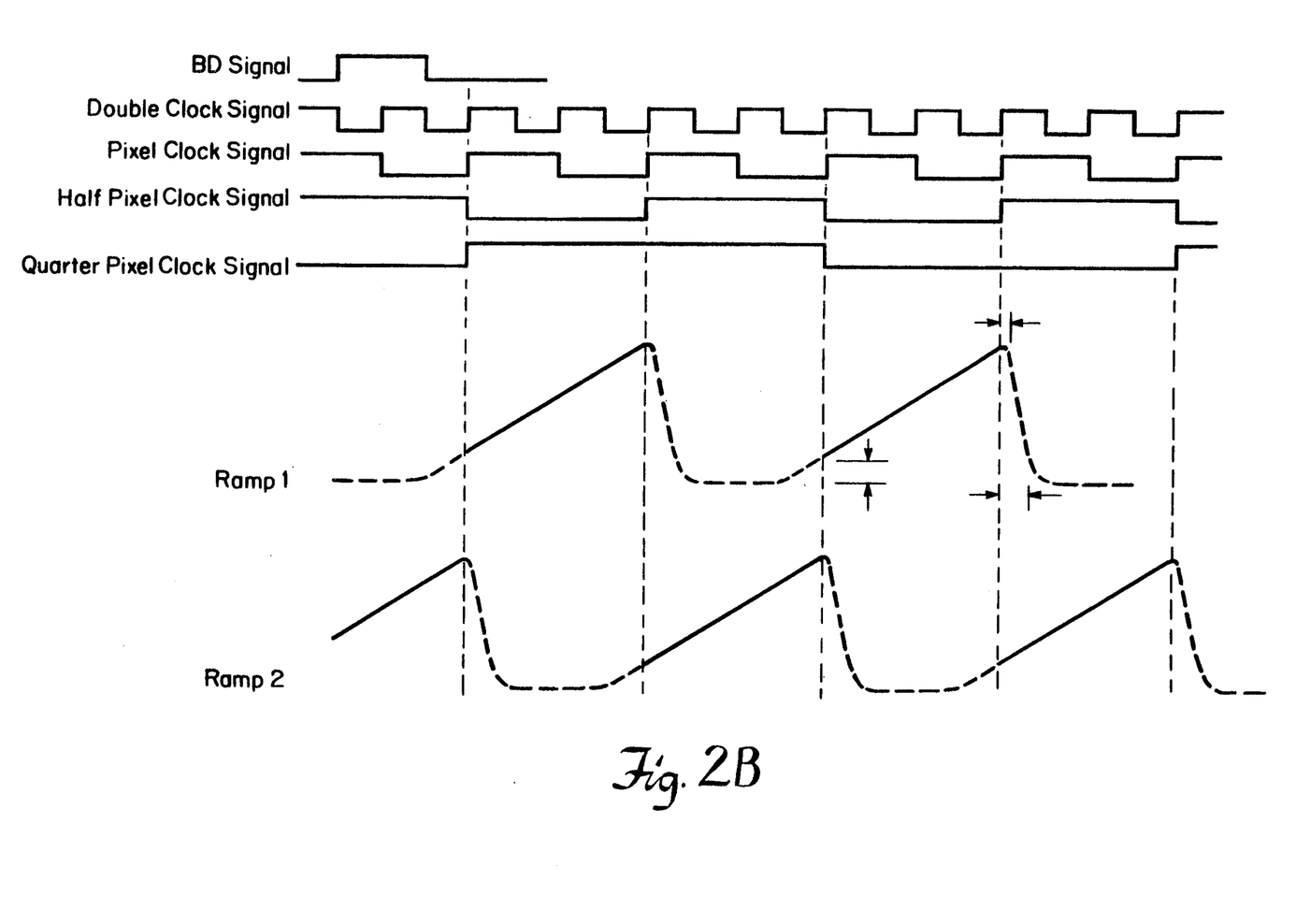
FIG. 2B is a timing diagram for the print engine driver of FIG. 2A.

FIG. 2B depicts the relationship of the generated timing signals and the ramp signals generated by modulator 36 to the BD, or beam detect, signal generated by print engine 18 at the start of a line scan. Clock circuit 30, described in detail below in conjunction with FIG. 7, generates from the leading edge of the BD signal the pixel clock signal establishing the pixel period, which also establishes the pixel size because of the fixed laser scan rate. As an example, when the print engine driver according to this invention is used to drive a Canon LBP-SX raster scanning print engine, which typically operates at 300 lines per inch, the period of the pixel clock signal, or the pixel time period, is approximately 1 microsecond.

The pixel clock signal is derived from the double clock signal running at twice the rate of the pixel clock signal. The double clock signal is also used to generate the half-pixel clock signal and quarter-pixel clock signal, having, respectively, a frequency of one-half and one-quarter of the pixel clock signal. The overlap shown in phantom in FIG. 2B at the beginning and the end of each period may be provided to enhance reliability especially for very high speed engines. As is more fully described below, modulator 36 generates ramp signals ramp 1 and ramp 2 having a maximum duration of the pixel time period. Two ramp signals are used so that one ramp has enough time to settle and to reinitiate, after it is used to generate the video signal, before it needs to be used again. Thus, at least one ramp signal begins at the start of each pixel clock period and has a duration no longer than the pixel clock period.

A single ramp may also be used, creating a dead or inaccessible zone in each pixel. The illustrated embodiment uses four ramps, duplicating each of the two alternate-pixel ramps twice, one for each D/A converter, and has no dead zones.

Figure 3A:
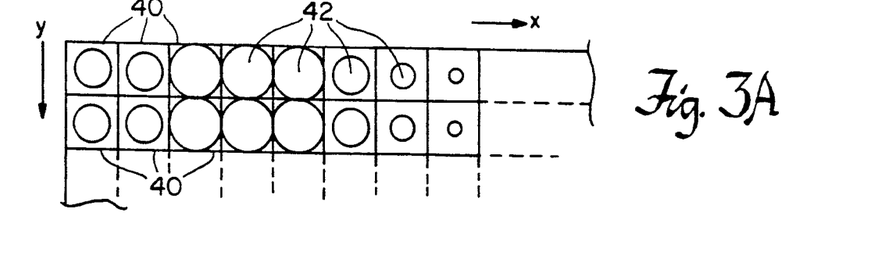
FIGS. 3A and 3B are schematic diagrams of a halftone dot output accomplished by the print engine driver according to this invention.
Figure 3B:
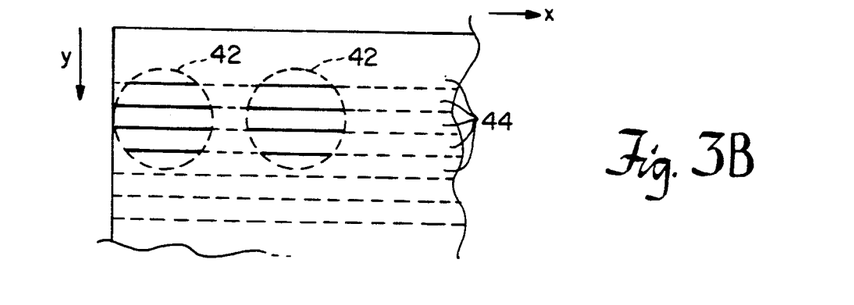

Raster scanning print engine driver 10 is preferably used to reproduce halftone images by causing print engine 18 to print halftone dots, schematically depicted in FIGS. 3A and 3B. Pixel areas 40, FIG. 3A, have a width in the horizontal direction X which is defined by the period of the pixel clock signal; that length is typically 1/150 inch. The length of each pixel 40 in the vertical direction y is a function of the print engine used; the length is a minimum of one horizontal scan line width, and can be chosen to be up to a maximum of four scan line widths in the current embodiment. In other words, halftone dots 42 may be made up of from one to four laser scans each. In the embodiment depicted in FIGS. 3A and 3B, square pixels 40 with halftone dots 42 centered therein are depicted. Other pixel sizes, and relationships of the halftone dots to the pixel areas, may alternatively be accomplished as is more fully described below.

FIG. 3B depicts schematically two adjacent halftone dots 42 each made of four line segments accomplished in four separate horizontal scans 44. The solid lines indicate schematically the printed line segments making up the dot. However, it should be understood that the lines actually have a width in the y direction defined by the print engine; they typically overlap to provide a more solid black image than that shown. Halftone dots 42 are thus generated as a series of line segments of controllable length and position within the pixel areas 40.

Figure 4:
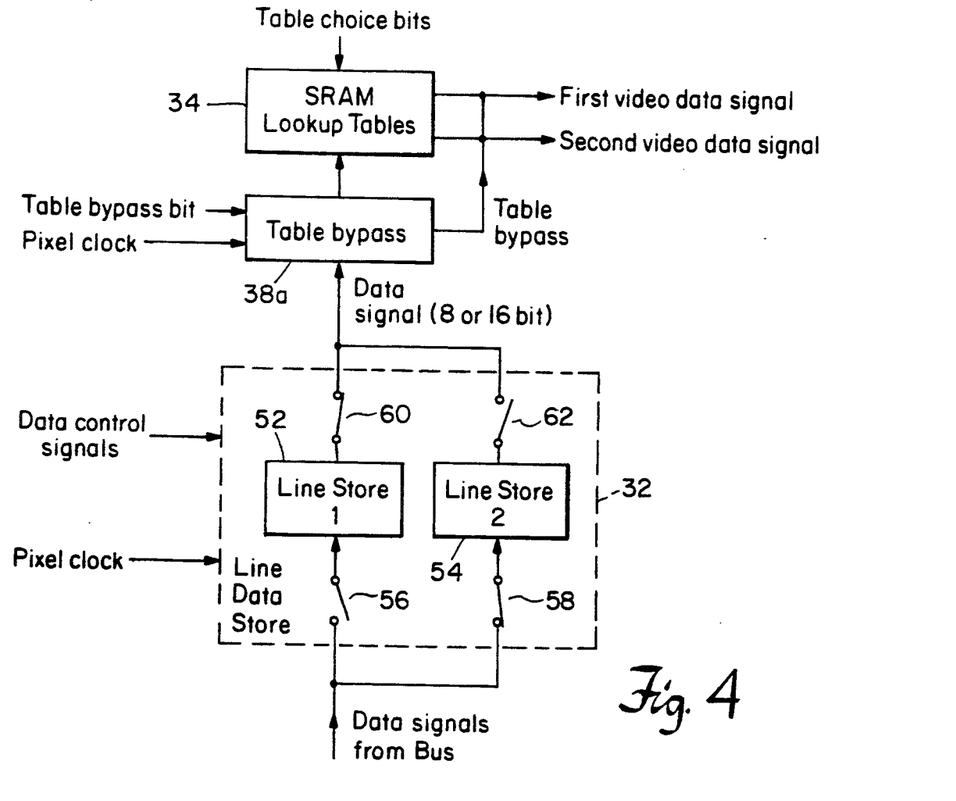
FIG. 4 is a more detailed block diagram of the line data store and lookup tables of FIG. 2A.

The digital signals representing an image are moved from the bus to the lookup tables as groups of signals representing an entire horizontal line scan using line data store circuit 32, FIG. 4. The data signals are typically eight or sixteen bit signals, each representing one pixel. Eight bit pixels are typically taken as two per each of the sixteen bit bus cycle on bus 28 according to bus timing signals. Sixteen bit pixels applied to the lookup tables typically have the low byte used to represent the gray level (in other words used as a lookup table address), with the high byte or part of it used to select the table, to provide the ability to change tables on each pixel. Alternatively, the sixteen bit pixels can bypass lookup tables 34, as explained below, in which case the first and last bytes are used directly as the first and second video data signals, respectively.

Line data store circuit 32 has sufficient memory to store two full lines of 16-bit data signals from the bus. Line data store 32 is responsive to the pixel clock signal as well as the software generated data control signals to control switches 56, 58, 60 and 62 in order to clock one line of data from one line store to the lookup tables, while the next line of data is moved from the bus and stored in the second line store. In the example shown, the data in line store 1 is being clocked to lookup tables 34 through closed switch 60, while the data representing the next line is routed to line store 2 by closed switch 58.

In most instances, the bus data signals are applied to lookup tables 34, which in response put out first and second digital video data signals representative of the first and second signal transition within a single pixel of the video signal applied to the print engine. The lookup tables are typically downloaded from the computer when the printer and driver are powered up. Lookup tables 34 are configured as is known to those skilled in the art so that the incoming data signals are used to address the memory locations, which in response generate two eight-bit video data signals provided to the modulator circuit a is explained in conjunction with FIG. 5. When eight-bit pixels are employed, the table currently in use is prechosen by the table choice bits under software control. When sixteen-bit pixels are employed, the high byte is interpreted as the table selection, and the low byte as the gray level, both together constitute the memory address. The address bits and the lookup table(s) are entirely under software control and may be assigned other interpretations than these.

Figure 5:
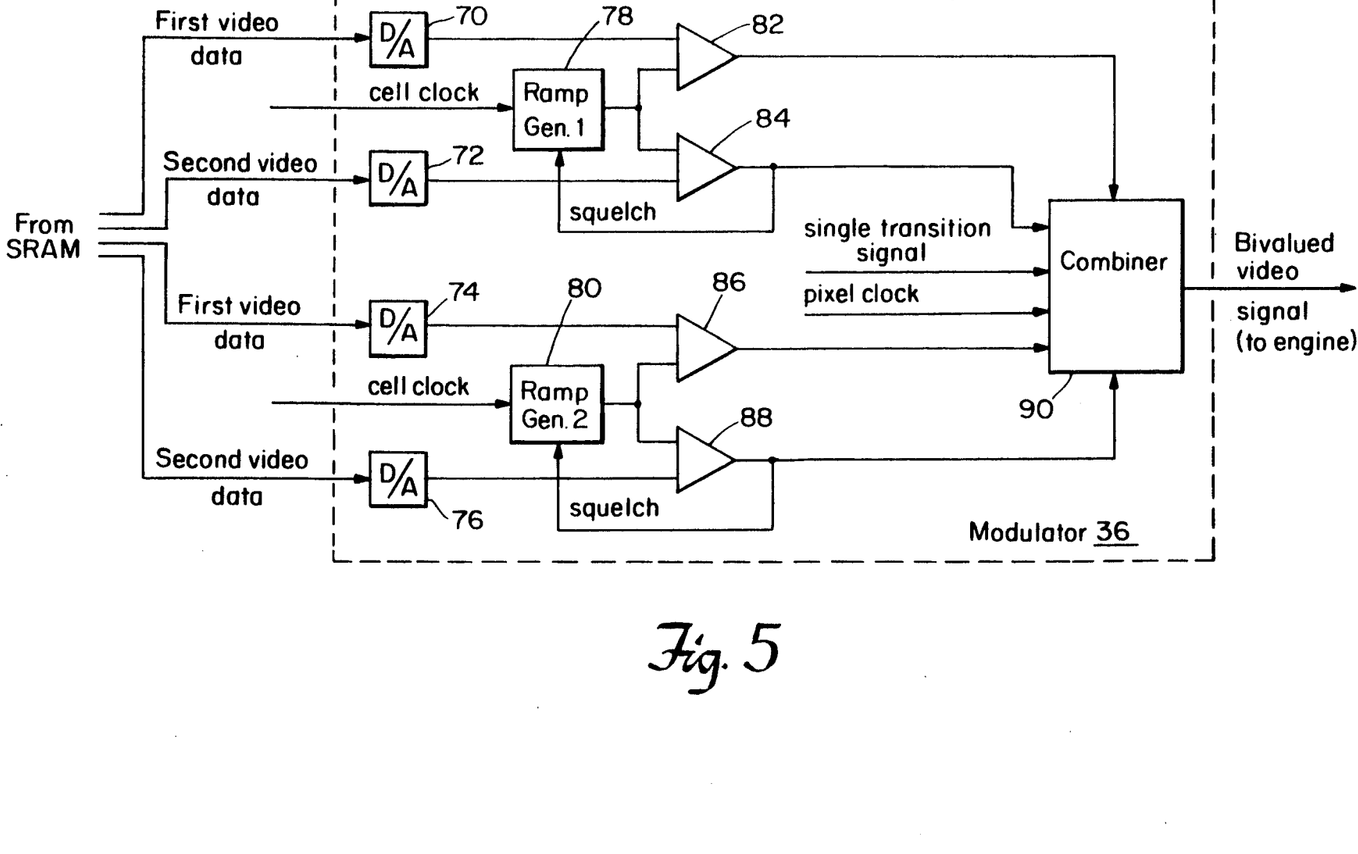
FIG. 5 is a more detailed block diagram of the modulator of FIG. 2A.

Modulator 36, FIG. 5, includes first set of D/A converters 70 and 72, and identical set 74 and 76, which alternately generate the video signal for each pixel. The first and second video data signals from the lookup tables are applied to one set of D/A converters, for example, converters 70 and 72, which in turn each put out an analog signal having a discrete value. Since the video data signals from the LUTs are eight bit signals, the analog signals each have one of 256 possible values. The lookup tables are normally configured so that the analog signal from converter 70 or 74 representing the first video signal is never higher than the analog signal from converter 72 or 76, respectively, representing the second video signal, although the signals may have the same value.

Ramp generator 78 under control of the pixel clock signal generates one of the ramp signals shown in FIG. 2B. The ramp signal is applied to comparators 82 and 84, which in response generate signals when the input analog data signal is crossed by the ramp signal. Thus, the signals from comparators 82 and 84 have transitions at the two places at which the analog video signals meet the ramp signal. The second transition, resulting from the second video data signal, is employed to squelch the ramp signal from generator 78. Combiner 90 takes in the pulses from comparators 82 and 84, and in response produces a pulse width and position modulated video signal which is applied directly to the print engine to control the laser to print one or more line segments whose lengths and positions within the pixel area are uniquely determined according to the values of the first and second video data signals.

On the next occurring pixel clock signal, ramp generator 80, D/A converters 74 and 76, and comparators 86 and 88 are employed to accomplish the same function as the parallel set of circuitry described above. Thus, each set of the two sets of parallel circuitry are used for alternate pixels. This arrangement allows the ramp signal to have a period which may be as long as the pixel time period in order to allow the two video signal transitions to be placed anywhere within the pixel. When a single transition within a pixel is desired, the first transition byte is set as all ones, representing the end of the pixel interval, where the first transition normally would not occur. Combiner 90 takes this signal in directly, and in response causes the only transition within the pixel to occur as a result of the second transition byte.

Figure 6:
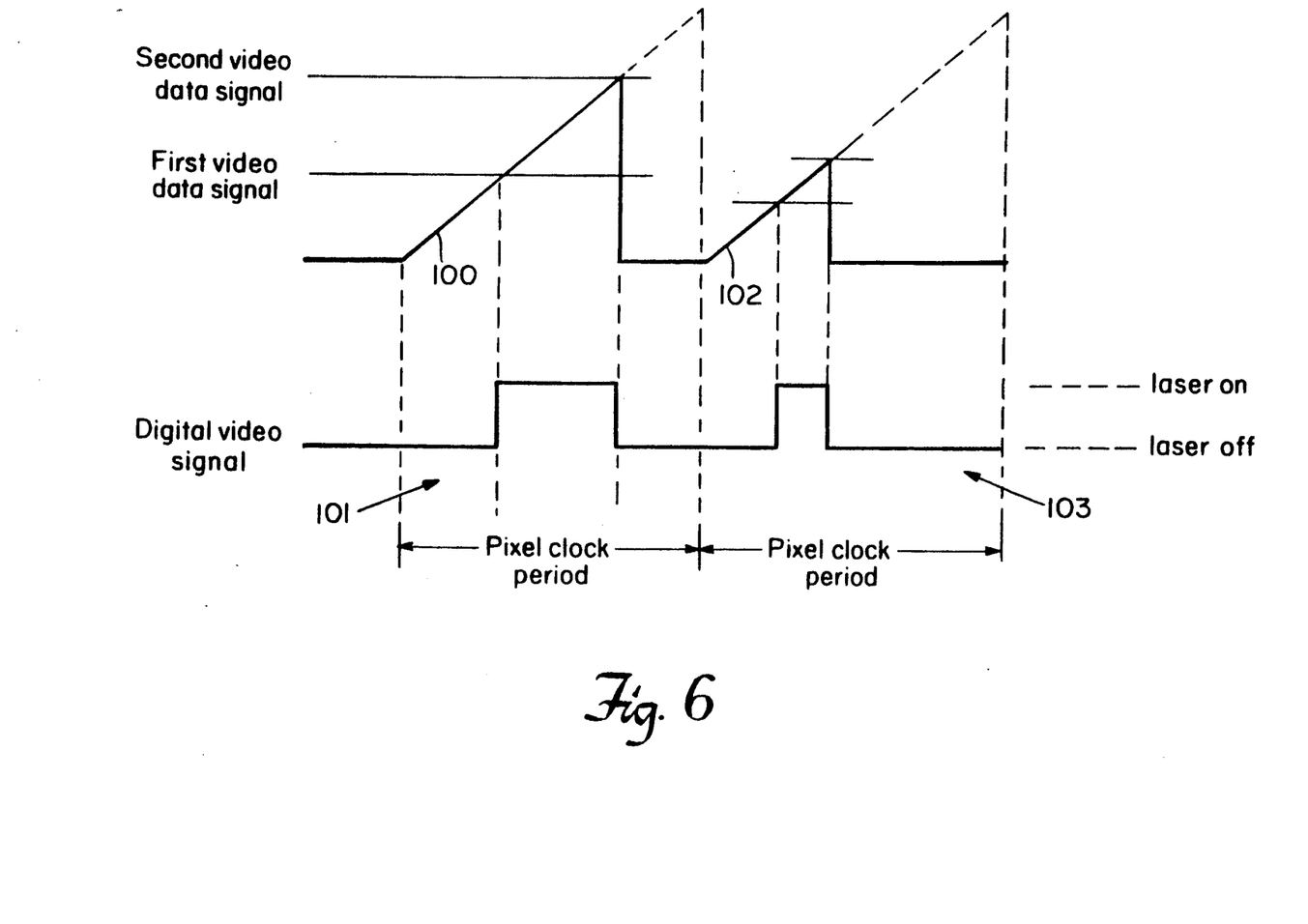
FIG. 6 depicts the signals employed by the modulator of FIG. 5, and the video signal created therefrom.

The modulated video signal put out by modulator 36 is shown in FIG. 6, which depicts the generation of the video signal for two adjacent pixels. The signal within first pixel 101 is accomplished by comparing ramp signal 100 from ramp generator 78 to the first and second analog video data signals. When the first video data signal meets ramp 100, the output video signal reverses polarity. Typically, the line scan starts with the video signal low, representing "laser off", and the first transition takes the video signal high, and turns the laser on. Subsequent transitions cause the output video signal to repeatedly change state and to turn the laser on and off. The second video data signal-ramp crossing within each pixel also is employed to squelch ramp 100 as shown. Ramp signal 102 from ramp generator 80, FIG. 5, is employed for alternate pixels to generate the transition modulated video signal as shown.

As can be understood by the combinations of FIGS. 5 and 6, the first and second video data signals may determine both the width and position of a video signal pulse. It should be understood that if the signal is high to start with, the transitions will create an "off" period defined by the incoming data signals. This results in the two transitions determining the end of one printed line segment and the beginning of another. To accomplish no transition within a pixel, first and second video data signals having the same value are employed, causing both transitions to occur at the same time. The single transition case, which changes the state of the signal in all subsequent pixels in the scan line, produces a single change in state in the video signal as described above. The result of this arrangement is that either zero, one, or two output video signal transitions may be provided within each pixel.

Since the analog video data signals are generated from eight bit video data signals, the analog signals have one of 256 values. This provides the ability to place the transitions at any of 256 different locations within each pixel. The result is that, for example, a pixel clock with 150 pixels per inch, may be employed to accomplish 150 times 256 or about 40,000 possible transition locations per inch. 40,000 one-off dots-per-inch would be required to achieve this performance in a bit-map architecture. The pixel clock may arbitrarily be chosen and be above or below the LPI of the engine.

Figure 7:
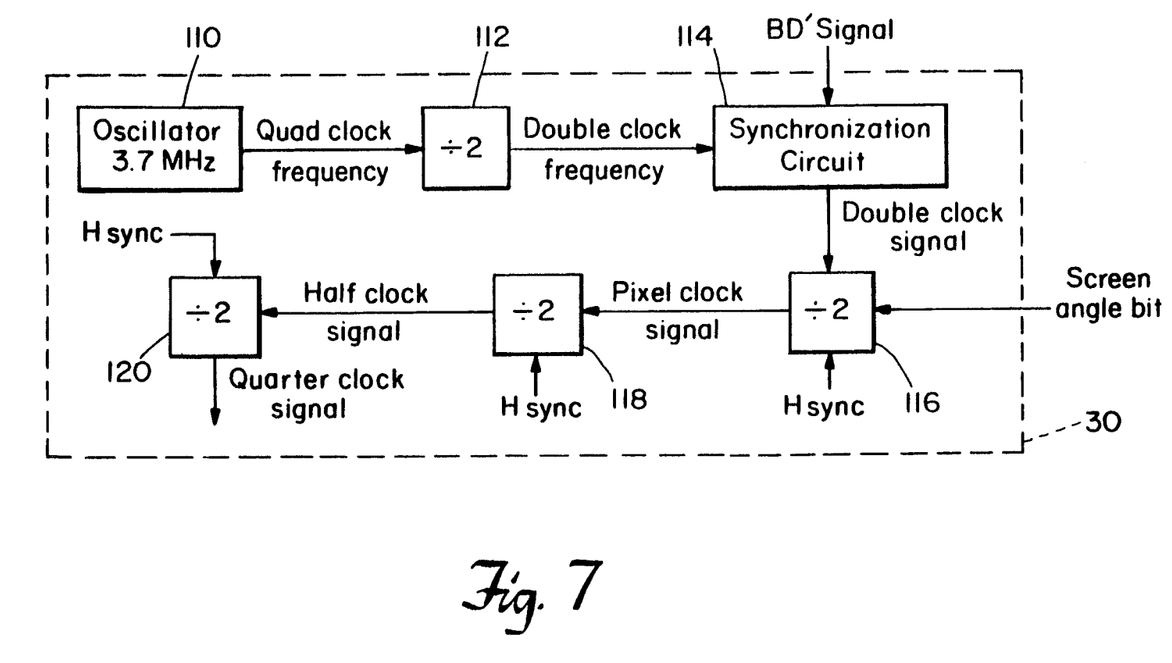
FIG. 7 is a more detailed block diagram of the clock circuit of FIG. 2A.

The portion of clock and control function circuit 30 which provides the clock timing signals shown in FIG. 2B is schematically shown in FIG. 7. Crystal oscillator 110 operating at 3.7 megahertz is employed for generating a signal at that quad clock frequency; this creates a 150 line screen on a 300 LPI engine. Frequency divider circuit 112 puts out the double clock frequency signal shown in FIG. 2B, which runs at twice the speed of the pixel clock signal, generated from circuit 116. Synchronization circuit 114, shown in more detail in FIG. 8, has as its input the double clock signal and the BD' signal, the same as the BD signal except when the horizontal sync is software generated, in which case BD is ignored. Synchronization circuit 114 puts out the double clock signal depicted in FIG. 2B which has the same frequency as the double clock input but is carefully synchronized with the beginning of the laser scan to prevent horizontal misalignment of the different vertically displaced segments of the halftone dots, which would result from horizontal jitter in the output. Frequency divider circuit 116 in response to the double clock signal and the software generated screen angle signal puts out the pixel clock signal which clocks the various operations throughout the circuit, including generating the output video signal; the pixel clock signal thus determines the pixel lengths, and pixel positions in the scan line. Circuit 118 again divides the pixel clock signal to generate a half clock signal, which is divided again by circuit 120 to generate the quarter clock signal. It should be understood that the output of circuit 30 are the pixel clock, half clock and quarter clock signals shown in FIG. 2B.

Figure 8:
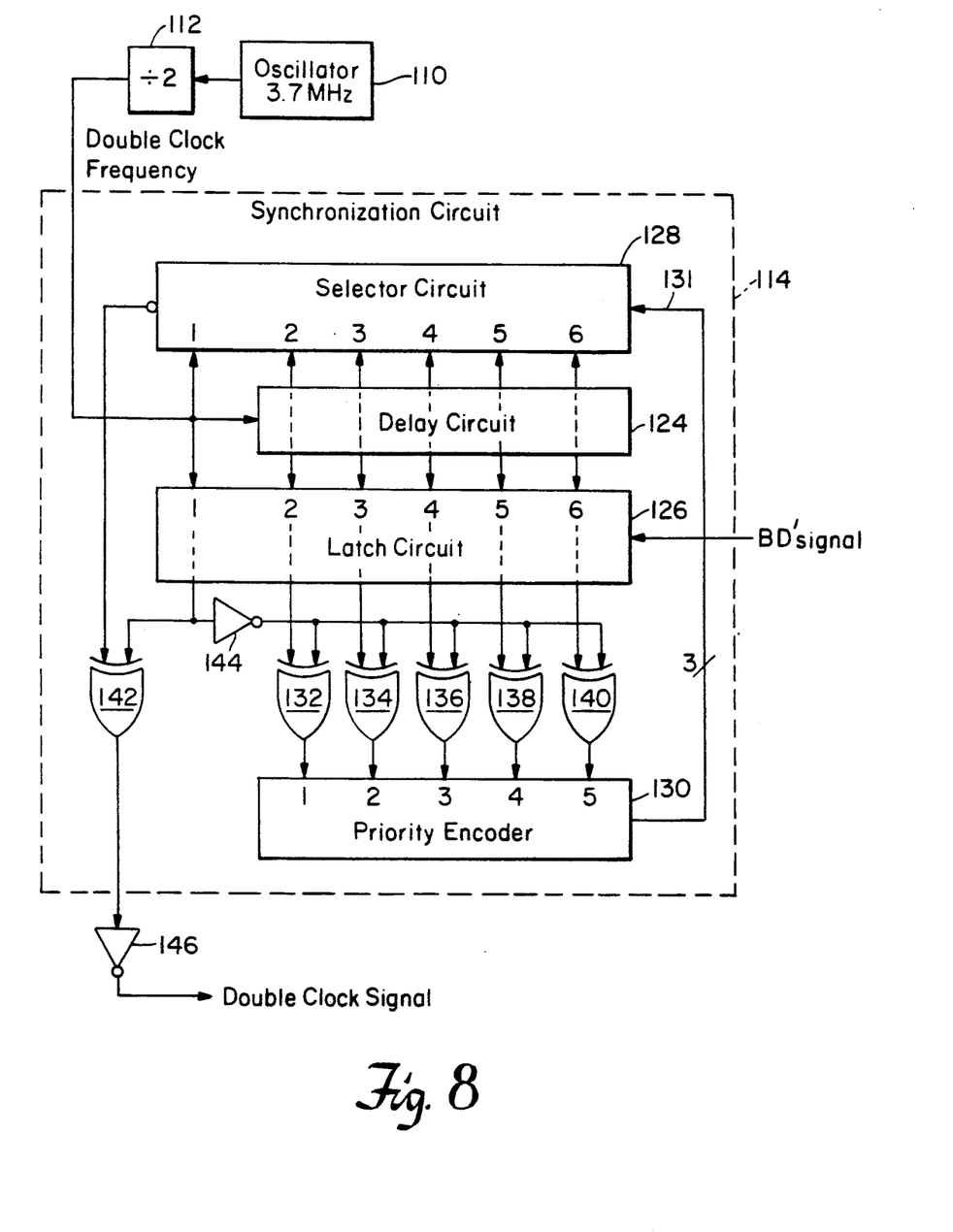
FIG. 8 is a more detailed schematic diagram of the horizontal synchronization circuit of the clock circuit of FIG. 7.

Synchronization circuit 114 is shown in more detail in FIG. 8, in which it can be seen that the fixed clock signal, having a frequency of the double clock signal, and a random phase vis-a-vis the BD signal, is provided as an input to delay line 124, which in turn has five outputs labelled two through six, which along with its input labelled one, are provided both to selector circuit 128 and latch circuit 126. The input and five outputs of delay circuit 124 are, from output one to output six, square wave signals each delayed one-twelfth (one-sixth of one-half) of the period of the double clock frequency signal more than the previous. In other words, delay circuit 124 effectively divides the double clock frequency square wave signal into six equally spaced signals. Latch circuit 126 has as its input these six signals as well as the BD' horizontal sync signal, which is normally identical to print engine BD signal identifying the beginning of a laser scan. The BD' signal leading edge freezes the latch inputs one through six at the time of the BD' signal. As a result, the latch circuit output holds the values of inputs one through six at the time of the BD' signal for the entire scan line, until receipt of the next BD' signal at the start of the next scan line. Thus, the evenly divided six-part double clock frequency signal is effectively frozen at the start of the beam line scan.

Output one from the latch circuit, representing the value of the double clock frequency signal at the time of the BD' signal, is passed to gate 142 and also to inverter 144 for application to gates 132, 134, 136, 138 and 140, which are also supplied with the signals from latch circuit outputs 2 through 6, respectively. The output of gates 132, 134, 136, 138 and 140 are applied as inputs 1 through 5 respectively of priority encoder 130. A priority encoder determines where the first significant (non-zero) digit of an incoming binary number is, and puts out a binary number representing that position. For example, if latch circuit 126 output from pins one through six respectively is 000111, the input to priority encoder 130 at inputs 1 through 5, respectively, is 11000, and priority encoder 130 supplies a signal on line 131 to selector circuit 128 which represents the first zero input, position three. Selector circuit 128 in response takes the input at the enumerated position 3 for its output, applied to exclusive or gate 142, the output of which is applied to inverter 146. This arrangement results in the production of a square wave signal at the double clock frequency which is synchronized with the BD' signal to within one-twelfth of the double clock period, or one twenty-fourth of the pixel clock period. The result is that the pixel clock signal is synchronized to the BD' signal with an error of approximately plus or minus two percent of the pixel clock signal period, which results in a maximum potential line to line horizontal misalignment of plus or minus two percent of one pixel, which is typically 1/7500 inch. This synchronization control is accomplished without an extremely fast oscillator, which allows the synchronization circuitry to run at speeds comparable to the rest of the circuit, greatly increasing horizontal control without operating at prohibitive frequencies.

Figure 9A:
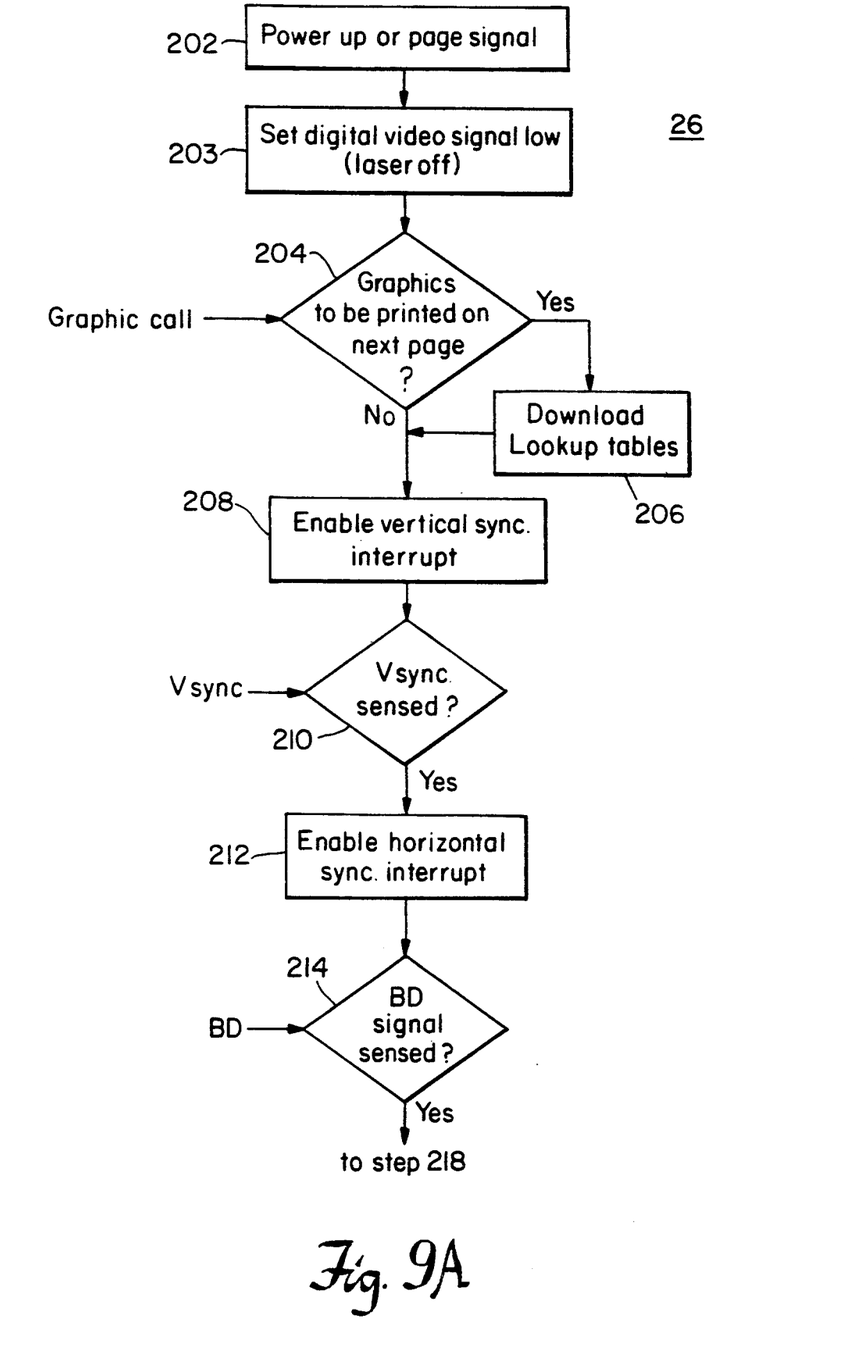
FIGS. 9A, 9B and 9C are block diagrams of the driving software for the raster scanning print engine driver according to this invention.
Figure 9B:
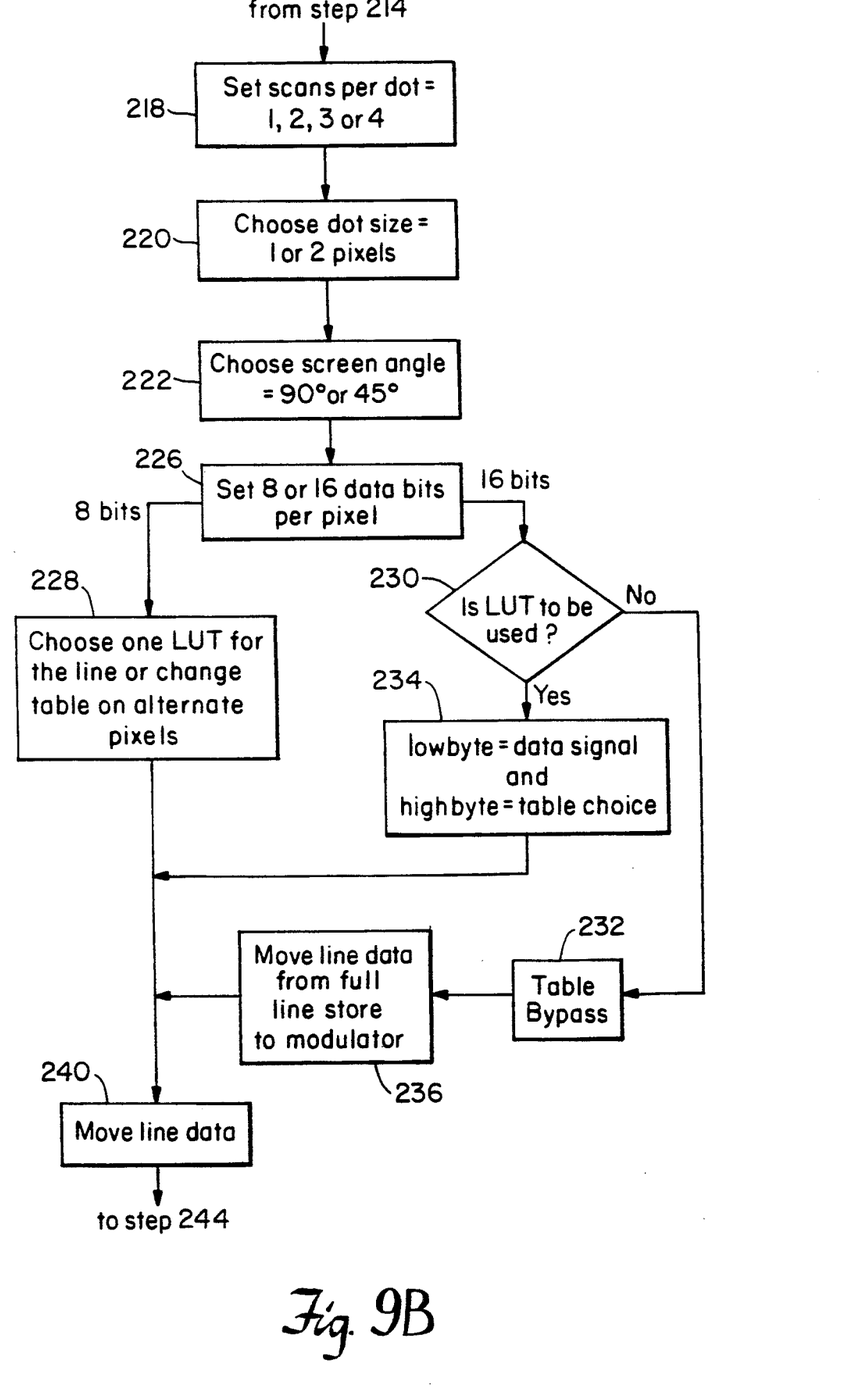
Figure 9C:
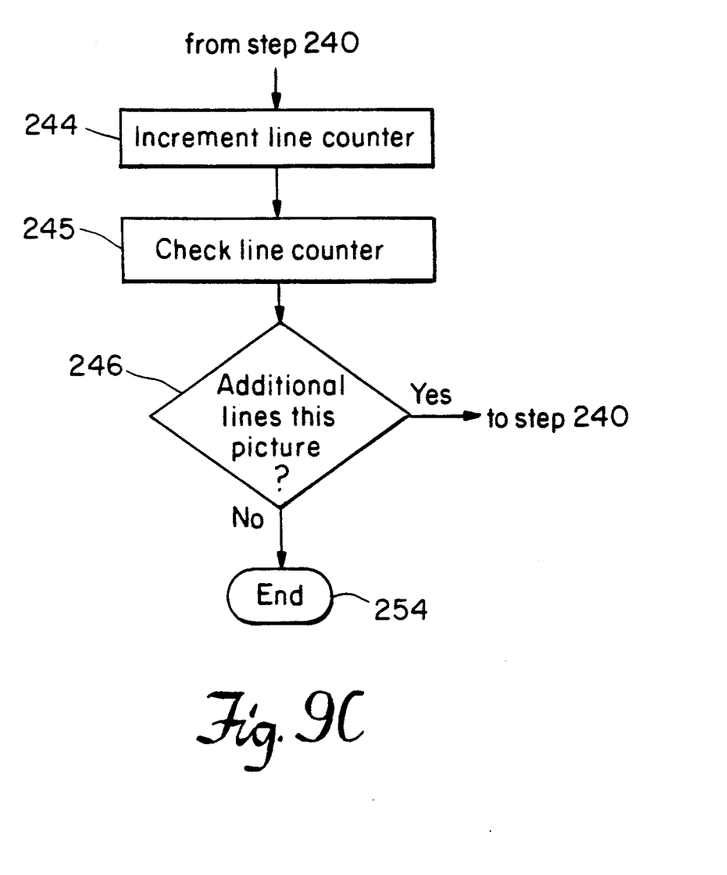

Software 26 for controlling the operation of the driver circuitry is shown in FIGS. 9A through 9C. Flow chart 26 begins at step 202, which enables the software at power up or when the last page printing is complete. When graphics are to be printed on the next page, step 204, the lookup tables are downloaded from the computer memory, step 206. The vertical sync interrupt is enabled, step 208, to provide a page-print starting point of the beginning of the paper feed into the printer. From that point, each horizontal halftone line is counted by keeping track of the beam interrupts from the print engine, and the position of the data lines on the page is determined in accordance with the number of lines sensed. The vertical sync is sensed in step 210. At step 212, the horizontal sync interrupt is enabled for sensing the BD signal from the print engine in step 214. In steps 218, 220, 222, and 226 a number of software controlled options are chosen.

In step 218, the number of horizontal scans making up each halftone dot is chosen. In step 220, the dot size is chosen as either one or two pixels; this provides the ability to make dots having a width of either one or two pixels, with a length of from one to four horizontal scans. At step 222, a screen angle of 90° or 45° is chosen. The 90° screen angle provides the output as shown in the example of FIG. 3A, in which the pixels are vertically aligned. The 45° screen shifts every other line to the right a distance equal to one-half of a pixel length using a screen angle signal provided to divider circuit 115, FIG. 7, which in turn delays its pixel clock signal output by one-half period for every other line. In step 226, the pixel word size is chosen as either 8 or 16 bits. From this point, operation proceeds separately for a number of steps depending on the chosen pixel word size.

If the pixel word is eight bits long, at step 228 either there is one look-up table chosen for the entire line, or the tables are switched between two tables on alternate pixels for the entire line, accomplished with a table choice signal applied to tables 34, FIG. 4. Operation would then proceed to step 240.

For 16 bit data words, the next program step is a decision as to whether or not the lookup table is to be used, step 230. If the tables are not being used, the table is bypassed, step 232, for routing the data words directly to the first and second video data signal lines as shown in FIG. 4. In that case, the line data is clocked directly to the modulator circuit rather than the lookup tables, step 236. If the lookup tables are to be used, at step 234 the low byte is chosen as the data signal (table address signal), and the high byte is chosen as a table choice bit. Operation proceeds to step 240, in which the line data is moved from the full line store circuit, FIG. 4, to the lookup tables, and the next line data is provided to the empty line store.

The line counter is incremented, step 244, and the line counter is checked, step 245. If there are additional lines in the picture being generated, operation loops back to step 240. If there are no more lines, operation ends, step 254.

Although specific features of the invention are shown in some drawings and not others, this is for convenience only as each feature may be combined with any or all of the other features in accordance with the invention.

Other embodiments will occur to those skilled in the art and are within the following claims, for example the ramp signal may be replaced by a different variable signal such as an RC exponential or a triangle wave signal. In that case, it is simply necessary to configure the LUTs so that the analog signals occur at the proper time in relation to the variable comparison signal (e.g. the triangle wave), so that the transitions occur where desired.

What is claimed is:

1. A raster scanning print engine driver for generating, from an incoming signal representative of an image, a series of engine drive signals for causing the engine to reproduce the image as a series of printed line segments, comprising:
   means for establishing a pixel scan time period representing a pixel print area;
   means for generating from the incoming signal a plurality of pixel signals for separately defining a position and a length of each line segment to be printed in a pixel print area; and
   means, responsive to said means for generating, for producing in said pixel scan time period from said pixel signals a print engine drive signal representative o the position and length of the line segments to be printed in said pixel print area.

2. The print engine driver of claim 1 in which said means for producing includes means for creating a ramp signal.

3. The print engine driver of claim 2 in which said ramp signal has a usable duration no greater than said pixel scan time period.

4. The print engine driver of claim 2 in which said pixel signals are analog signals.

5. The print engine driver of claim 4 in which said means for producing further includes means for comparing said ramp signal to said analog signals for inverting said drive signal when said ramp signal and said analog signals cross.

6. The print engine driver of claim 2 further including means for indicating a beginning of a print engine raster scan.

7. The print engine driver of claim 6 further including means, responsive to said means for indicating, for synchronizing said pixel print area to the beginning of the raster scan.

8. The print engine driver of claim 7 in which said means for synchronizing includes means for generating a digital timing signal used to establish said pixel scan time period.

9. The print engine driver of claim 8 in which said means for generating a digital timing signal is responsive to said means for indicating the beginning of a raster scan for synchronizing said digital timing signal to the beginning of the raster scan.

10. The print engine driver of claim 9 in which said means for establishing a pixel print area is responsive to said means for generating a digital timing signal for synchronizing said pixel print area to the beginning of the raster scan.

11. The print engine driver of claim 9 in which said means for generating a digital timing signal includes means for providing a clock signal with a same period as said digital timing signal.

12. The print engine driver of claim 11 in which said means for generating a digital timing signal includes means for dividing a clock signal period into a plurality of equal time intervals.

13. The print engine driver of claim 12 in which said means for generating a digital timing signal includes means, responsive to said means for indicating the beginning of the raster scan, for choosing a time interval occurring at approximately a same time as the beginning of the raster scan.

14. The print engine driver of claim 13 in which said digital timing signal begins at said chosen time interval for closely matching said digital timing signal to the beginning of the raster scan.

15. A driver for modulating a raster scanning print engine drive signal, comprising:
   means for establishing a pixel time period;
   means for generating at least one ramp signal;
   means for generating from an incoming image signal first and second analog data signals representative of a position and length of any line segments to be printed; in said pixel time period
   first means for comparing in said pixel time period said first analog data signal to a said ramp signal to change a state of the drive signal a first time when said ramp signal and said first data signal cross; and
   second means for comparing in said pixel time period said second analog data signal to a said ramp signal to change the state of the drive signal a second time when said ramp signal and said second analog data signal cross.

16. The raster scanning print engine driver of claim 15 further including means for squelching said at least one ramp signal on a second drive signal state change.

17. A raster scanning print engine driver for generating, from an incoming signal representative of an image, a transition modulated engine drive signal for causing the engine to reproduce the image as a series of printed line segments, comprising:
   means for establishing a pixel scan time period representing a pixel print area; and
   means for generating from the incoming signal, at least a case of two independently locatable engine drive signal transitions during the pixel scan time period, each said transition causing the print engine to change state at a selected point along a engine scan.

18. The raster scanning print engine driver of claim 17 in which said means for generating further generates a case of an odd number of transitions during the pixel scan time period.

19. A raster scanning print engine driver for generating, from an incoming digital signal representative of an image, an engine drive signal, comprising:
   means for establishing successive pixel scan time periods representing successive pixel print areas;
   digital-to-analog converting means for converting the incoming digital signal into at least one analog video signal;
   means for generating first and second ramp signals having complementary active regions in alternating pixel scan time periods; and
   means for comparing said first and second ramp signals with said at least one analog video signal to modulate the engine drive signal.

20. The raster scanning print engine driver of claim 19 in which said means for comparing includes at least two comparators, where comparator outputs are combined to produce the engine drive signal.

21. A raster scanning print engine driver for generating, from an incoming digital signal representative of an image, an engine drive signal, comprising:
   means for establishing successive pixel scan time periods representing successive pixel print areas;
   two digital-to-analog converting means having different conversion timing for converting an incoming signal into two analog signals which are used in alternate pixel scan time periods;
   means for generating at least one ramp signal; and
   means for comparing said at least one ramp signal to said two analog signals to generate output pulses modulated at least in width.

22. The raster scanning print engine driver of claim 21 in which said means for comparing includes at least two comparators, wherein comparator outputs are combined to produce the engine drive signal.

* * * * *